United States Patent [19]
Roberts

[11] Patent Number: 5,376,948
[45] Date of Patent: Dec. 27, 1994

[54] METHOD OF AND APPARATUS FOR TOUCH-INPUT COMPUTER AND RELATED DISPLAY EMPLOYING TOUCH FORCE LOCATION EXTERNAL TO THE DISPLAY

[75] Inventor: Jerry B. Roberts, Arlington, Mass.

[73] Assignee: Visage, Inc., Framingham, Mass.

[21] Appl. No.: 231,968

[22] Filed: Apr. 22, 1994

Related U.S. Application Data

[63] Continuation of Ser. No. 857,241, Mar. 25, 1992, abandoned.

[51] Int. Cl.⁵ .............................................. G09G 5/00
[52] U.S. Cl. ........................................ 345/173; 345/156
[58] Field of Search ............... 340/706, 709, 711, 712; 341/20, 33, 34; 73/65, 862.541, 865.8; 178/18, 19; 345/156, 158, 162, 173, 178, 184

[56] References Cited

U.S. PATENT DOCUMENTS

| | | | |
|---|---|---|---|
| 3,657,475 | 4/1972 | Peronneau et al. | 73/862.041 X |
| 4,198,539 | 4/1980 | Pepper, Jr. | 178/18 |
| 4,293,734 | 10/1981 | Pepper, Jr. | 178/18 |
| 4,340,777 | 7/1982 | DeCosta et al. | 178/18 |
| 4,353,552 | 10/1982 | Pepper, Jr. | 273/85 |
| 4,355,202 | 10/1982 | DeCosta et al. | 178/18 |
| 4,371,746 | 2/1983 | Pepper, Jr. | 178/18 |
| 4,389,711 | 6/1983 | Hotta et al. | 178/18 X |
| 4,675,569 | 6/1987 | Bowman et al. | 178/18 X |
| 4,806,709 | 2/1989 | Evans | 178/19 |
| 4,821,029 | 4/1989 | Rogano et al. | 340/712 |
| 4,918,262 | 4/1990 | Flowers et al. | 340/718 X |
| 5,038,142 | 8/1991 | Flowers et al. | 340/706 X |

FOREIGN PATENT DOCUMENTS

| | | | |
|---|---|---|---|
| 0052343 | 3/1984 | Japan | 341/34 |
| 0254313 | 12/1985 | Japan | 341/34 |

*Primary Examiner*—Jeffery Brier
*Attorney, Agent, or Firm*—Rines and Rines

[57] ABSTRACT

A method of and apparatus for determination of touch location on a display screen or the like or other surface embodying a force-sensing platform or surface supporting or otherwise externally contacting the display screen monitor apparatus, and responding to the forces created by the thrust of touching a point of the display screen, to sense and calculate the location of the touching point. The underlying technique employs force-sensing means responsive to all six degrees of freedom of applied (touching) force and torque, achieving force location away from the plane of the sensors and in spite of tangential force components by calculating the point of least magnitude of the three-dimensional torque vector from among all points within the screen or surface, and outputting this point as an estimate of the intersection point of the screen or surface with the thrust line of the touching or other contact force.

20 Claims, 5 Drawing Sheets

METHOD OF AND APPARATUS FOR TOUCH-INPUT COMPUTER AND RELATED DISPLAY EMPLOYING TOUCH FORCE LOCATION EXTERNAL TO THE DISPLAY

This is a file wrapper continuation application of application Ser. No. 857,241, filed Mar. 25, 1992, now abandoned.

The present invention relates to touch screen cathode-ray tube and similar displays, as for use in computers and other video systems and the like, being more particularly directed to novel methods of and apparatus for determining the touch force location on the display from apparatus disposed external to and remote from the display, as distinguished from force sensors applied to the periphery and/or over or adjacent the display surface itself.

More generally, still, the invention relates to novel three-dimensional force locating techniques adapted for measurement of forces applied outside the plane or surfaces of force-sensing elements.

BACKGROUND OF INVENTION

Though thus more general in application, one of the important uses of the invention is in the field of computer or related display screen systems, such as cathode-ray tube displays (or LCD, LED, electroluminescent or other electro-optical displays or the like); and it is therefore to this exemplary use that the invention will hereinafter be described as an important illustration.

A modern computer typically presents its user with such a display screen on which may be presented descriptions or pictoral representations of various choices or selections which the user may make. In many cases, the quickest, easiest, and most intuitive way for the user to respond is by physically finger-touching the areas of the screen which show the desired selections.

To allow this, the computer must be equipped with an input device which permits the program on which it is operating to determine the fact and location of such touch events. For present purposes, any input device of this sort will be termed a "touch screen".

A desirable touch screen input device should be inexpensive, rugged, reliable, and sufficiently accurate. It is also very desirable that a single model work with a wide range of different display devices, and that it be susceptible to easy field installation by untrained users, either on new or on existing equipment.

Unfortunately, existing touch screens, such as those later described, are of relatively low manufacture volume and thus very expensive by the standards of their natural market, being therefore precluded in major usage from integration at the time a display is manufactured. In addition, they require great effort, expense, and manufacturing expertise to retrofit. Since each model is more-or-less unique to a specific screen geometry, different models must be made in great profusion, or would-be users must be restricted in their display choice. For a combination of functional and cosmetic reasons, thus, certain prior art touch screens are indeed built into the display device, such as a cathode-ray tube, at initial manufacture (though expensive, due to low volume), and others require an awkward retrofit (also expensive). Such prior touch screens, moreover, are closely tied to the design of the display device with which they are to be used, and must be provided in a profusion of different types to find wide application. Many, furthermore, have inherently expensive sensor structures tightly constrained by the geometry, compatibility, and packaging constraints of the associated display, so that sensor structures cannot often be optimized for cost.

Turning to such prior art techniques for determining touch location on a cathode-ray tube or similar display screen, they involve some combination of distributing sensors around the periphery of, or over the surface of, the actual displaying surface or screen. Such known methods employing force sensing to locate the point at which a force is applied to a surface generally embody three or more force sensors placed in a plane, but not allowed to lie along a single line. The axis of sensitivity of each is oriented perpendicular to this plane, and the outputs of the sensors are used to compute the location of contact forces which are applied in this same plane. If and when the contacted surface is allowed to depart from this plane, the unpredictable tangential components of the contact force must necessarily cause errors in the reported location. If the contact surface lies far from the plane of the sensors (or is severely non-planar), prior methods are ineffective.

Specifically, a first system of this nature is adapted for the front portion of cathode-ray tube screen displays, being provided with various additions to enable touch localization, including both resistive and capacitive sensing technologies, in which an extra sensor plate is applied over the face of the display screen. The plate bears one or two layers of transparent conductor patterns which develop and convey touch location information to conductors at the edge of the overlay plate. While efforts are made to keep all components transparent, losses in practice are sufficient substantially to reduce image brightness and clarity. Examples of such touch screen sensors may be found in U.S. Pat. Nos. 4,198,539; 4,293,734; 4,353,552; 4,371,746; 4,806,709; and 4,821,029.

A second approach involves surface acoustic wave (SAW) technology in which a glass overlay plate carries acoustic energy generated, redirected, and sensed by transducer and reflector means disposed about the periphery. Touching the plate damps this energy in a manner particular to the contact location, as described, for example, in Eleographics 1987 flier "Surface Acoustic Wave".

Another technique has involved a planar force sensing technology in which piezoelectric force transducers support a glass overlay plate, attaching it to a mounting. The intersection of a finger-touch thrust line with the transducer plane occurs at a point which is associated with a specific ratio of transducer outputs, allowing the position of this point within the plane to be computed. When curved, phosphor-bearing screen surfaces must necessarily deviate from the plane, creating a particular form of parallax error in which the user, expecting response at a particular point, instead actually receives response at another point. Sensor techniques and signal processing suitable for such an approach are described, for example, in U.S. Pat. Nos. 4,340,777; 4,355,202 (and prior art strain gauge sensors described therein including U.S. Pat. No. 3,657,475 and "One-Point Touch Input of Vector Information for Computer Displays," C. Herot et al., Computer Graphics, Vol, 12, No. 3, pp. 210–216); and U.S. Pat. No. 4,675,569.

Still another approach uses planar force-sensing technology in which steel beam springs with strain gauge transducers constitute force sensors bearing the entire weight of, for example, the cathode-ray tube assembly. This technology avoids the image degradation of an overlay plate, but at the cost of requiring greater sensor dynamic range and problems of rejection of stray signals from sway and vibration. Its function is otherwise substantially identical to the above-described piezoelectric system. U.S. Pat. Nos. 4,918,262 and 5,038,142 describe such a system, citing, also, earlier piezoelectric and related sensors.

Infrared light technology has also been proposed in which many separate beams travelling from emitters to detectors define a plane. When the user's finger (or other probe of sufficient width) crosses this plane, the identity of interrupted beams locates the "touch". Again, a transverse component to the touch motion can lead to a parallax error in which response at the expected location is replaced by response at an unexpected location. Parallax errors for this technology tend to be particularly severe, since the response surface cannot be positioned to intersect the phosphor surface, nor be shaped to conform to it. Additionally, such apparatus may require obtrusive bezels. An example of such a system is described in pages 12–44 of a text entitled "Caroll Touch", which also summarizes the before-described resistive-capacitive sensor overlay systems, surface acoustic wave systems and piezoelectric systems, as well.

Each of the above methods has an effective response surface which, unfortunately, fails to be coincident with the active surface of the display, leading to the universal prior performance imperfection of parallax.

The before-described resistance, capacitance and acoustic plate sensors have a response surface which conforms to the actual physical surface of touch contact, such lying visually about ½ inch in front of the phosphor surface in the case of a cathode-ray tube display. An operator whose eye is somewhat to the side, will therefore perceive an error in the touch system response unless touching a surface point that lies directly over the desired target point, rather than the target point itself.

The piezoelectric and other planar force-sensing systems above-described, on the other hand, do not actually report an actual location of surface contact, but rather provide what may be called an "indicated point" on a "virtual response surface". The indicated point is at the intersection of the thrust line and the plane of the force sensors. For the described infrared beam system, such an indicated point is where the finger breaks the plane of the infrared beams. Since the glowing phosphors are not located in such plane, the virtual surface does not correspond to anything visible or intuitive, making the parallax error of these devices particularly troublesome.

Underlying the present invention, however, is the discovery of a novel method of and apparatus for enabling a wide variety of cathode-ray tube or other screen display systems, as in computers, monitors and other video systems and the like, to be placed upon or in touch with a common, universal force-sensing platform, the sensors of which are thus external to the plane of the display screen and remote even from the display equipment itself, but nonetheless provide a novel three-dimensional force locating technique for forces, such as the finger-touching of the display screen, while obviating all of the above-described limitations and disadvantages of the prior art techniques, including the total elimination of parallax.

Other distinguishing features of the invention from the above-described and other prior art approaches will be more fully addressed hereinafter.

OBJECTS OF INVENTION

A principal object of the present invention, accordingly, is to provide such a new and improved method of and apparatus for touch screen sensing, void of the limitations of prior art systems, and, to the contrary, adapted for unobtrusive location of the sensing external to the display, preferably beneath or in back of it, and universally employable with a wide variety of display systems of many different configurations and types.

A further object is to provide such a novel touch-locating input device for use in conjunction with a computer display, to locate touches directed at features of the displayed image; and which, in addition to unobtrusive location external to the display, can easily be field installed, with one or a very few types or sizes adaptable to all displays. Such design, furthermore, which can be optimized for low cost, since unconstrained by internal design aspects of the display, is robust, long-lived, and immune to wear, providing parallax-free response for any display surface, and without degrading the displayed image.

Additionally, it is a further and more general object of the invention to provide a novel method of fully locating the thrust line of a force in three-dimensional space, or the line of minimum torque, accurately determining the location of a force applied to a surface, or the location at which a force is directed through a surface. Such surface may be far removed from the plane of the sensors, may be substantially different from a flat plane surface, and is not constrained by device design to have a particular relationship in space to the device.

In accordance with the invention, moreover, a device embodying the same may be programmed or calibrated in use to project a virtual response surface of any shape to any location, subject only to certain natural limitations. Such limitations are that the thrust lines of the forces to be localized shall intersect the response surface with positive polarity at but a single point (or more precisely that the lines of minimum torque magnitude do so), and that the object bearing the physical surfaces to be matched by the virtual projection, shall be appropriately coupled to or supported by the measuring device, with the distances and forces involved falling within the dynamic range and sensitivity of the particular measuring device.

Other and further objects will be explained hereinafter and are more particularly delineated in the appended claims.

SUMMARY OF THE INVENTION

In summary, however, in one of its important applications, the invention embraces a method of determination of touch location on a display surface apparatus, that comprises, contacting the display surface apparatus against or in touching relationship to a force-sensing platform having sufficient degrees of freedom and sensing sensitivity to develop and encode, in response to the thrust of touching a point of the display surface, the coordinate components of the resulting thrust vector and the components of the accompanying torque vector; calculating from the encoding, a location on a line of minimum torque to provide an intersection of the display surface; and outputting the resulting sensed location as an estimate of said touching point.

In the best mode and preferred form of the invention, a six-degree force platform or plate is employed upon which any monitor or other display device may be placed, receiving line power and sending a single parallel or serial port cable to the host computing device— say, for example, an IBM PC (personal computer) or the like. The format may be something like an electronic bathroom weight scale, but reading out six numbers at once instead of one. These encode the same information as is contained in the x, y, and z coordinate components of thrust, and the roll, pitch, and yaw components of torque. For convenience, the actual numbers are an equivalent linear transformation of these.

The challenge in recovering a touch position from such a remote sensor platform or surface lies in the fact that the direction of touch force on the display screen can vary greatly from one instance to the next, even when exactly the same point on the screen is touched. When the sensors cannot be confined to the same effective plane as the touch (as is done with, and indeed required by prior art devices, as before explained), different touches at the same point of the screen may produce different sets of numbers.

The present invention admirably obviates these problems, however, by taking two important considerations into account, the appreciation and application of which are at the heart of the invention.

First, the force at the point of contact can be described quite accurately as a pure thrust. For present purposes, the torque components referenced to this point are negligible—partly because the area of contact is small, and in part, because the finger is not attached to the screen. This kind of force is referred to herein as a "simple contact force", defining the "thrust line" as the locus of points obtained by extending the thrust vector through the point of contact. For a simple contact force then, the line in space of points with minimum (in this case, zero) magnitude of the three dimensional torque vector is coincident with the thrust line of the force.

Secondly, a measurement of the thrust and torque occasioned by the touch at some remote reference point is sufficient to reconstruct the line of minimum torque, and therefore the thrust line. (For simplicity, in the discussion that follows, the term "thrust line" is sometimes used to refer to the line of minimum torque which approximates it. The method of the invention, however, deals directly with the latter.) Although the theory and practice of this will be more fully developed below, consider first a brief outline of the principle involved.

The thrust (or perhaps more intuitively, the reaction thrust to maintain static equilibrium) is an invariant of position, but the torque is not. The torque vector is perpendicular to the plane containing the thrust line and the reference point, and has a magnitude equal to the product of the thrust magnitude times the distance at closest approach of the thrust line to the reference point. Since the directions and magnitudes of the thrust and torque vectors are obtained by measurement, one can, in summary, calculate backwards as follows: (1) Find the direction perpendicular to the plane containing the thrust and torque vectors (which direction of two is determined by consistent use of some handedness rule); (2) Proceed in this direction a distance equal to the magnitude of the torque vector divided by the magnitude of the thrust vector, ending up at the point on the thrust line which is closest to the reference point; (3) Extend the (known) thrust vector through this point to obtain the thrust line which, of course, intersects the surface of the display screen in a single point. The contour of this surface either is known, or is conveyed to the computer through an appropriate calibration procedure enabling the location of the touch point.

Other details of best mode design and construction are more fully described hereinafter.

DRAWINGS

The invention will now be described in connection with the accompanying drawings, FIG. 1 of which is a side elevation depicting the use of the force-sensing platform of the invention as a remote touch screen system for a computer or similar monitor with a cathode-ray tube display screen supported on the platform;

DESCRIPTION OF PREFERRED EMBODIMENT(S)

Figure 1:
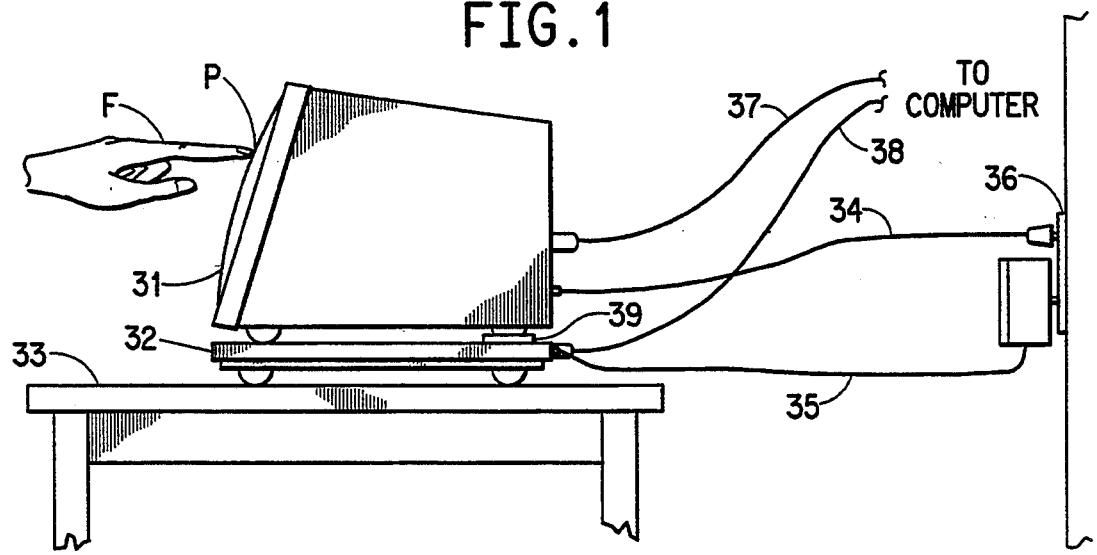

A six degree-of-freedom force sensing platform 32, FIG. 1, is used to provide information sufficient for the calculation of an "Effective Thrust Line" resulting from a "Simple Contact Force" arising where the monitor display screen 31 (or other object, in general) supported upon the platform, is touched or contacted by another object, as by the finger F. The platform also contains electronic signal conversion and calculating means suitable to prepare and deliver desired output results to external devices, as over, for example, a simple RS-232 serial communication link 38.

Force Locating Platform Construction

FIG. 1 depicts the platform embodiment 32 of the remote force-locating device constructed in accordance with a preferred form of the present invention, contacting or touching, indeed supporting, the base surface of the cathode-ray tube monitor 31 on support surface 33 to provide a touch screen function, though remote from the cathode-ray tube screen itself which is touched by the user. The force locating device 32 receives power through an AC adapter cable 35, and communicates location information to a computer (typically a personal computer, or "PC", not shown) through, for example, the cable 38.

Figure 2:
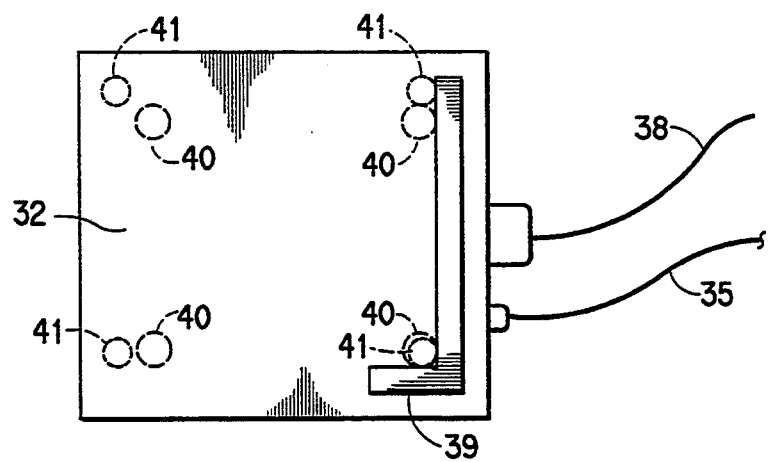
FIG. 2 is a top elevation of the platform sensor of FIG. 1 depicting a simple means for reproducibly locating the supported monitor upon the force sensing platform of the embodiment of FIG. 1.

Since the calibration of the locating function depends upon the position of moniter 31 with respect to the platform 32, the platform is provided with a stop 39 (see also FIG. 2), which is an "L" shaped strap or land of material protruding above the platform surface. The monitor 31 is slid back and to the right against the stop 39, giving an accurately and rapidly reproducible position. Dashed-circle sets 40 and 41 illustrate two possible patterns of foot location for two possible monitor styles.

Figure 3:
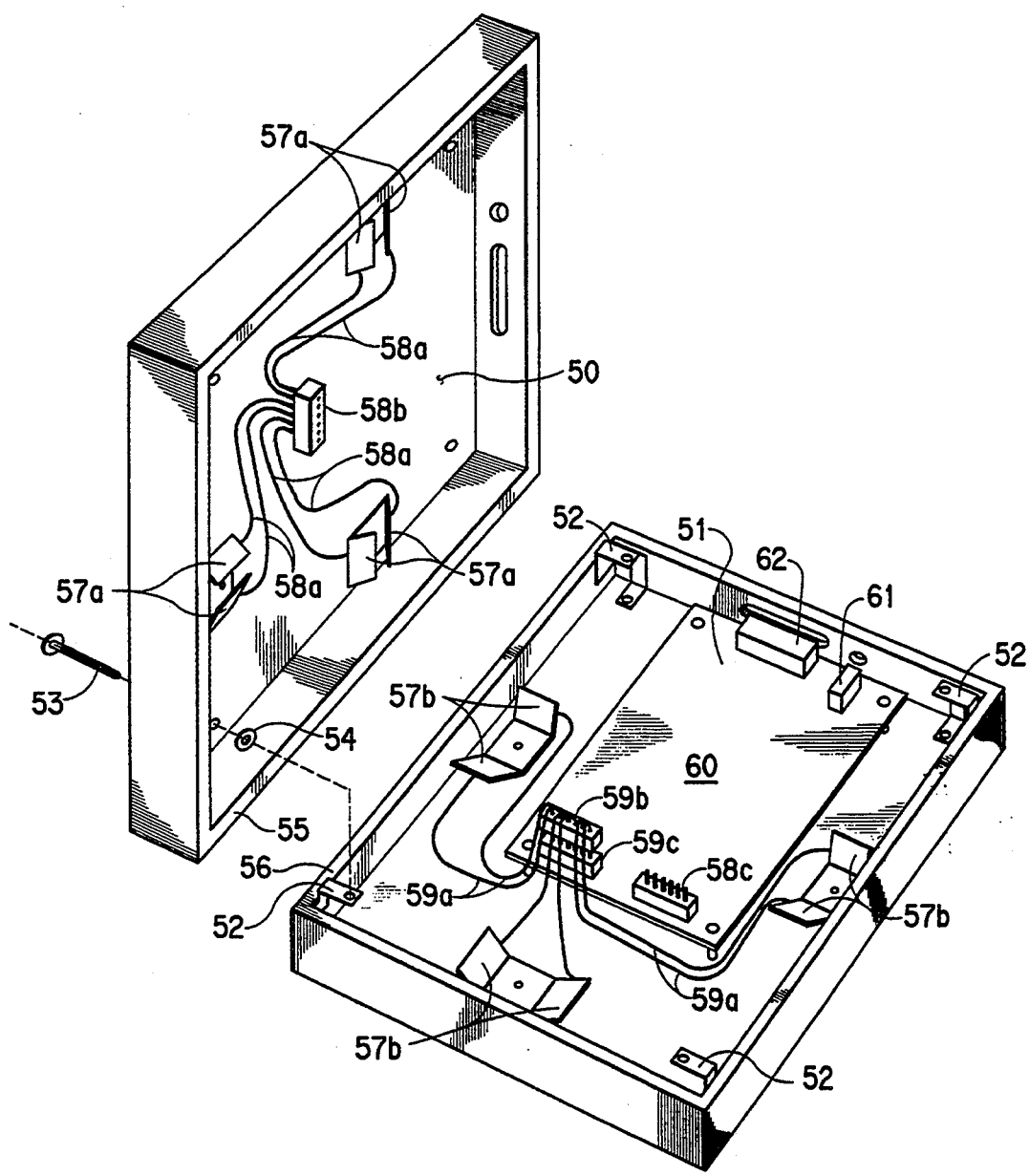
FIG. 3 is an isometric view of the major components and the construction of the force sensing platform, showing the same in open position.

In FIG. 3, the platform 32 is shown separated or opened into an upper plate assembly 50 and a lower plate assembly 51. When brought together and fastened with screws 53 and washers 54 (only one set shown), a flange 55 overlaps flange 56, so that the four steel beam springs 52 in the corners carry the entire weight of the upper assembly and all supported objects. Only under conditions of overload, do the flanges contact each other or the opposing plate, so as to protect the beam springs 52 and hereinafter discussed capacitor sensors 57 (having upper and lower segments 57a and 57b) from damage. The upper capacitor elements 57a face and align within the lower capacitor elements 57b to provide linearly independent measurements responsive to all six components of plate-to-plate displacement. These capacitance sensors are shown provided substantially midway along the front of, and toward the rear of the two sides of the platform plates. Six wires 58a provide connection of the upper elements to printed circuit board 60 through connector halves 58b and 58c. Similarly, 59a, 59b, and 59c provide connection to the lower elements. Connector 61 provides power, allowing the printed circuit board electronics (not shown) to compute force location data which is then outputted through connector 62.

Figure 4:
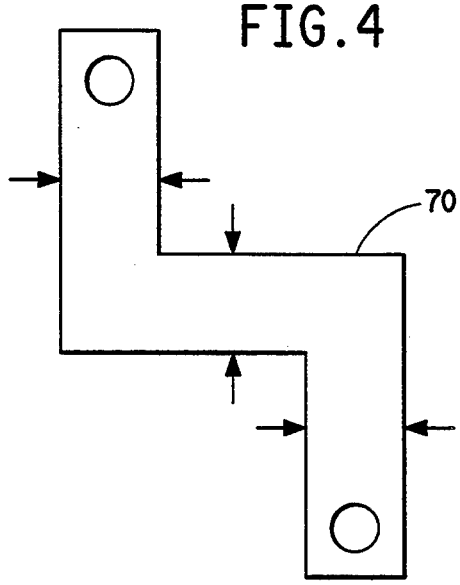
FIGS. 4 and 5 illustrate a design for the springs used in the platform.
Figure 5:
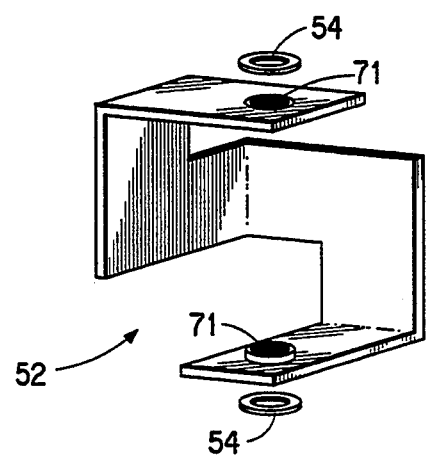

The beam spring 52 is shown enlarged in FIG. 5. It may be produced from a double-L flat 70 of FIG. 4, folded, as shown, and provided with press-fit threaded inserts 71.

Figure 6:
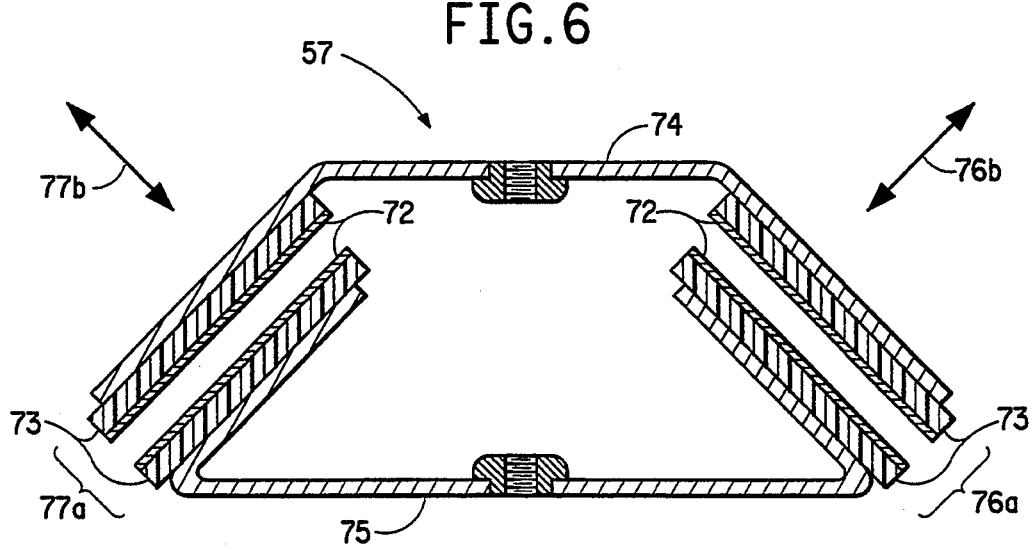
FIG. 6 is a cross-sectional view of the details of a suitable pair of capacitive displacement sensors for the platform.

FIG. 6 shows details of a pair of suitable and preferred capacitor displacement sensors 57 in section. The plates may be formed from rectangles of unetched printed circuit board material, for example, about 3 square inches in area. Foil capacitor plates 72 are supported on insulating laminates 73, which in turn are attached by adhesive to an upper bracket 74 and a lower bracket 75. The brackets 75 and 74 are nesting brackets, which are shown flattened parallel to the platform plates 50 and 51 to which they are respectively secured. The free arms of the brackets are bent outwardly (for 74) and correspondingly inwardly (for 75) to mount the pair of capacitor plates 72, oriented at matching angles (shown as 45°) to the platform. Capacitor 76a, formed of the right-hand capacitor plates 72, FIG. 6, is sensitive to relative capacitor plate displacements along axis 76b orthogonal to the capacitor plates; while capacitor 77a, formed of the left-hand capacitor plates 72, is sensitive along orthogonal axis 77b. The two sensitive axes themselves are thus at right angles.

Operating Circuit Explanation

Figure 7:
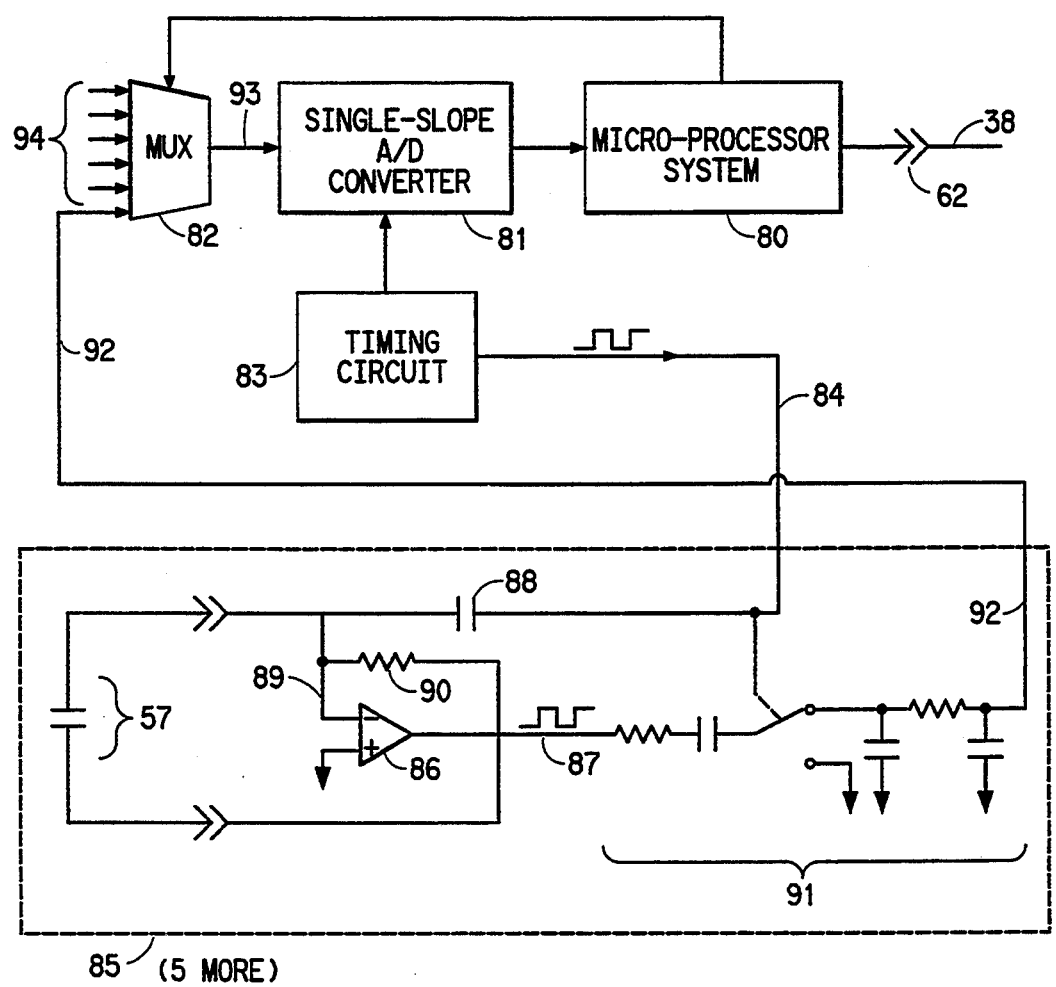
FIG. 7 is a simplified schematic circuit diagram of electronic conversion and calculating circuitry for the system.

FIG. 7 provides a simplified schematic diagram of the electronic conversion and calculating means incorporated in a successfully operated platform force sensing device 32. Microprocessor system 80 may be one of many different standard designs, such as the Intel Type 80188 with associated components, physically comprising one to several integrated circuits, and logically comprising a processing unit, read/write memory, firmware program memory, a small non-volatile read/write memory for storage of calibration and operating mode data, an asynchronous serial I/O capability for driving output cable 38, a digital input capability for receiving the output of analog-to-digital (A/D) converter 81, and a digital output capability for setting the input selection of a multiplexer 82.

Timing circuit 83 divides a 20 MHz clock by 128 to give 156 KHz 5 V square wave signal 84 for sensor drive, and by 65,536 to drive converter 81 to provide one 16-bit conversion every 3.3 ms.

Signal 84 is connected to each of six identical capacitor impedance measuring circuits 85. An operational amplifier 86 generates a signal 87, which transfers charge through the sensor capacitor 57 exactly equal and opposite to the charge flowing through fixed capacitor 88, thus maintaining virtual ground at its summing junction 89. The peak-to-peak amplitude of signal 87 is thus linearly proportional to the capacitor plate separation of sensor 57. A resistor 90 of high value (22 MOhm, for example) provides a return path for input leakage, keeping signal 87 within the operating range of amplifier 86. The value of capacitor 88 (5 pF, for example) is chosen approximately to match the value shown by the sensor capacitors under conditions of no platform load. A synchronous amplitude detection circuit 91 converts AC signal 87 to DC signal 92, which, in turn, is admitted through multiplexer 82 to A/D converter 81 when processor 80 selects this channel for measurement. Connections 94 lead to other circuits similar to 85. A complete set of measurements across all six inputs may be completed about fifty times each second.

To achieve the desired accuracy, the force platform 32 must be able to measure contact forces of a few ounces to a relative accuracy of about 1%. These must be measured in the presence of a large but unpredictable static load: i.e., monitors commonly weigh as little as twenty pounds to as much as eighty pounds or more. It is necessary, therefore, to find a design in which wide load range does not compromise either economy or the necessary sensitivity.

Since the smallest practical gap for capacitor sensor 57 is about 20% of the no-load opening, the amplitude of signal 87 may vary from about 5 V P—P (peak-to-peak) down to about 1 V P—P at the maximum monitor weight of 100 lbs. Circuits 91 and 82 being unity gain, the working input range of converter 81 is roughly 1 to 5 VDC. With appropriate operating margins allowed, this provides a sensitivity of about 500 counts/lb. Since the RMS noise is about 1 count, force changes of 3 ounces and larger can be resolved with 1% or better accuracy, based on a single conversion value difference from baseline. As the typical touch force determination is based upon a weighted average of a number of measurements, the actual minimum force is somewhat less.

Single-slope A/D converters may be of known design which can combine high resolution with low cost. Converter 81, as indicated, may have 16-bit resolution; but as a counterpart of its very inexpensive design, it has nowhere near the linearity or freedom from drift required for 16 bit absolute accuracy. Its non-linearity, however, is considerably less than 1%, and its worst case drift is less than a count per minute. As the firmware in processor 80 re-calculates baseline every few seconds or less, drift is thus obviated as a source of error. Since, moreover, it is the relative error of small changes that is of concern, not absolute error, the linearity is entirely adequate.

Analysis

The desired remote three-dimensional force locating (finger-touching) function is achieved by the above exemplary embodiment in the following manner.

In one mode, data specifying the Effective Thrust Line itself (or, more particularly, the effective line of minimum torque) may be the desired output.

In another, the intersection of the Effective Thrust Line with a known surface contour may be computed, and the coordinates of this point within the surface outputted, perhaps in combination with other detected characteristics, such as force magnitude. The known surface contour may match the actual physical exterior of the supported monitor or other object, or of a portion of it, in which case the coordinates identify the actual point of physical contact.

The force-sensing platform 32, in its most basic form, thus comprises two rigid plates 50,51 supported and separated by at least three springs 52 placed around the periphery. These springs, as above indicated, are preferably securely fastened at both ends so as to prevent all pivoting or sliding motions which might introduce mechanical hysterisis through friction. They are designed to offer (when so mounted) roughly equal spring rates in both compression and shear; such rates typically being in the range of a few one-thousandths of an inch per pound for each spring and in each direction. The overall spring rate is chosen as a trade-off between the greater sensitivities which can be achieved with a softer mounting, and the greater freedom from dynamical errors achieved when a stiffer mounting raises the resonant frequencies of the supported mass.

The capacitance displacement sensors 57 are mounted between the plates with positions and directions of sensitivity chosen effectively to encode all six degrees of freedom of rigid motion. These sensors, having the preferably variable geometry achieved through their previously described construction are inexpensive and sensitive. In another embodiment, each of the six sensors may comprise an optical emitter-detector pair mounted to one of the platform plates, the beam of each being variably attenuated by a small piece of graded transparency film supported from the opposing plate (not shown).

The sensor outputs are detected, scaled, and multiplexed to form the input to the A/D converter of FIG. 7. This, as earlier stated, may be of very inexpensive single-slope design while still providing the required wide dynamic range, since neither high stability nonperfect linearity is required. Digitized values sensitive to the various displacements are fed to the standard microprocessor system 80, which performs the necessary calculations and formats output as required by the application. In the case of this touch screen application, this may include emulation of other touch screen devices, as well.

Figure 8:
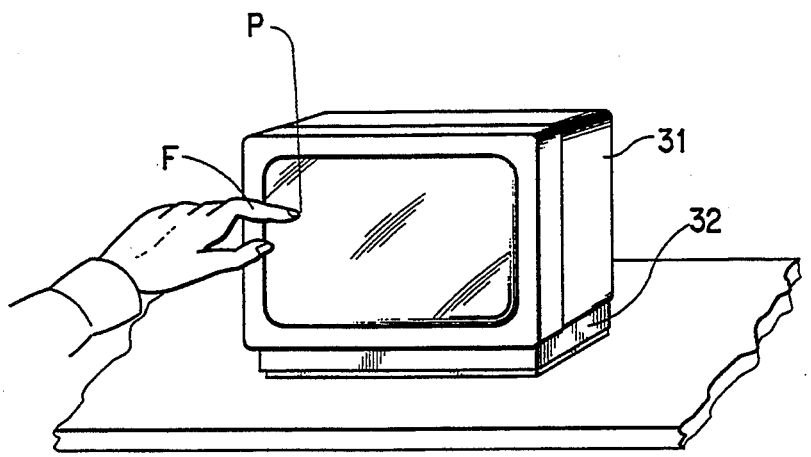
FIGS. 8–10 provide graphical depictions of the force vectors and geometry of the force locating operation for a force of the kind made locatable by the invention, and which is applied out of the plane of the platform sensors.
Figure 9:
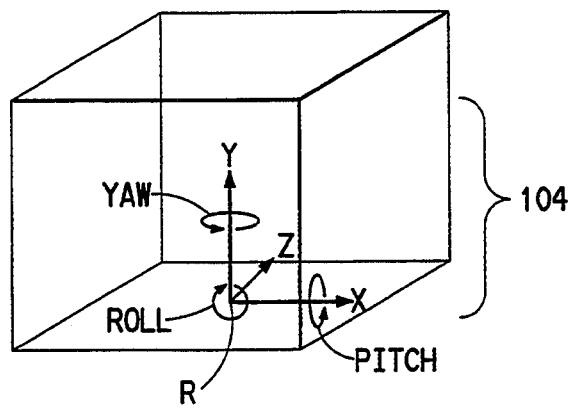
Figure 10:
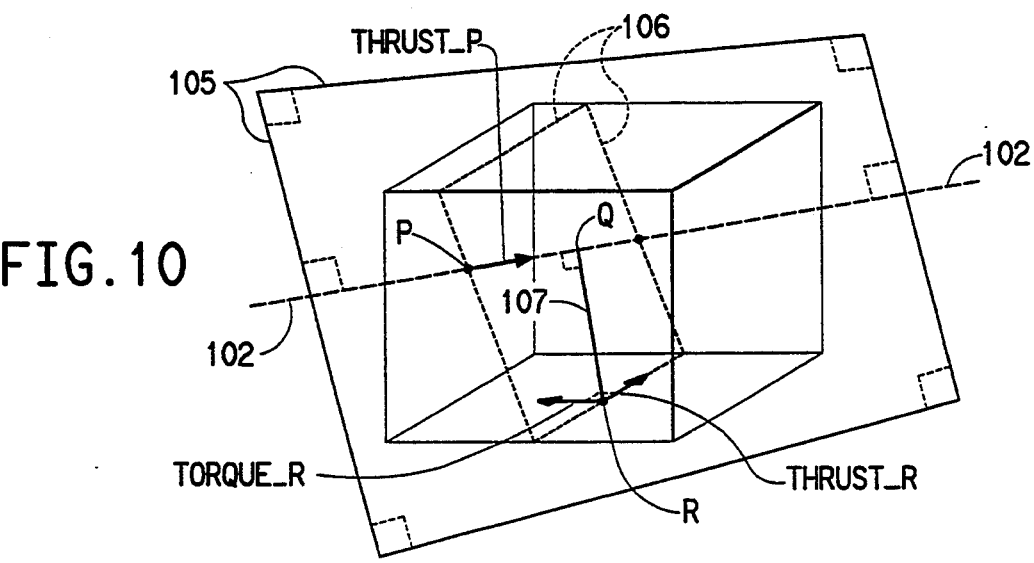

Thus, the touching of a point P on the display screen 31 of FIG. 8, will result in a thrust mechanically conveyed to the remote force-sensing platform 32, that, through the six degrees of freedom and sensing sensitivity thereof, will sense and develop encoding signals corresponding to (or corresponding to linear transformations of) the x, y and z coordinate components of the resulting thrust vector, FIG. 9, and the accompanying torque vector roll, pitch and yaw components. As shown in FIG. 10, as hereinafter more fully explained, the before-described microprocessor calculations will derive the remotely sensed location of the touching point, and output this at 38.

Theory of Use of Force Data

While FIG. 8 depicts the display device 31 resting upon the force sensing platform 32, FIGS. 9 and 10 re-represent this same system, but with the display and platform replaced by a transparent cube for diagrammatic clarity. For concreteness, a specific reference point "R" is shown, with a particular coordinate system illustrated at 104 in FIG. 9. Thrust and translation vectors may consist of an x, y, z enumeration of pound or inch values, and torque and rotation vectors may consist of a pitch, yaw, roll enumeration of pound-inch or radian values. Although centering and aligning the coordinates on the axes of symmetry in the manner suggested by FIG. 9 would make numerical examples of the matrices discussed below look simpler, this choice is otherwise arbitrary. For simplicity, moreover, force and sensor outputs will be discussed as though only time-varying components existed, since carrying through such constants as the display weight or the baseline sensor outputs would unnecessarily clutter the description without altering the results.

In FIG. 10, thus, a thrust vector THRUST_P is diagrammed at its point of application P. The "thrust line" of the force applied at P is defined to be the locus of points reached by the infinite extension of THRUST_P through touch point P. The actual area of contact between the user's finger and the display screen actually consists of many points close to P, through which infinitesimal contributions to the total thrust pass in directions roughly parallel to THRUST_P. This means that the torque exerted by finger pressure about P, and indeed about all points on the thrust line, is negligible. Since the torque magnitude of the force referenced to other points rises in proportion to their distance from the thrust line, there exists a well defined line of minimum torque magnitude which is virtually coincident with the thrust line for a force of this kind—called a "simple contact force". (Note that were the hand, instead of using finger touch, inserting a peg into a pegboard, the contact force might not be simple; the mechanical interlock of peg in hole would allow a substantial uncontrolled torque to be transmitted through the "point" of contact. Indeed, if the peg and hole were square, there would not need to be any relationship at all between the thrust line and the line of minimum torque).

As will be seen, the force measurements made by the platform are sufficient to compute the line of minimum torque. The external surface of the display, however, is also required to remain in fixed relationship to the force plate since the last performance of a user calibration procedure. (This procedure is, in effect, a way of letting the platform know where the screen is). The sensor data, therefore, is logically sufficient to locate the contact point of a simple contact force in three dimensional space, and, given appropriate calibration data, any two dimensional grid imagined on the surface.

Returning to FIG. 10, the reference point R has been selected to express the aggregate effect of the time-varying forces on the system. For greater clarity, the plane containing thrust line 102 and reference point R is made visible by rectangular segment 105, with sides parallel or perpendicular to the thrust line, and by the intersection 106, where this plane passes through the boundary of the cube representing the display and force platform.

The particular total force, later discussed, referenced as "TF_P@R", comprises THRUST_R and TORQUE_R taken together, and which, applied at point R in FIG. 10, would produce the same motions and displacements of the top plate of the platform as does the touch force at P. It is a known result, in fact, that there is always a unique equivalent total force of this kind for any reference point chosen. For present purposes, it is convenient to imagine R located at the center of symmetry of the suspension system inside the force sensing platform. (Since this is a point in empty space, one must imagine it connected to a massless rigid extension of the top plate).

The force at R equivalent to that at P is expressed by the relations:

$$\text{THRUST\_R} = \text{THRUST\_P} \qquad 1a$$

$$\text{TORQUE\_R} = \text{TORQUE\_P} + R\text{-->}P \text{ cross THRUST\_P} \qquad 1b$$

where "R-->P" is the displacement vector from point R to point P, and "cross" refers to the vector cross product. Since, for a simple contact force, TORQUE_P is effectively zero, TORQUE_R is perpendicular to plane 105 and has a magnitude given by the produce of the magnitude of THRUST_P times the length of vector R-->Q. (Q is found by dropping a perpendicular 107 to the thrust line). Consider the following equation for the location vector "R-->T" of a point "T":

$$R\text{-->}T = \text{Lambda} * \text{THRUST\_R} + (\text{THRUST\_R} \text{ cross TORQUE-R})/|\text{THRUST-R}^2, \qquad (2.$$

where paired vertical bars are understood to return the magnitude of the vector between them, and where the symbols "*", "/", and "^" represent the appropriate forms of multiplication, division, and exponentiation, respectively, and where "Lambda" represents a scalar parameter. The cross product in the second term on the right constructs a vector in the direction of R-->Q, with magnitude of $|R\text{-->}Q|*|\text{THRUST\_R}|*|\text{TORQUE\_R}|$, such that the whole second term can be seen to locate the point Q with respect to the reference. Since the first term represents an aribtrary length vector in the direction of THRUST_R, which is also the direction of THRUST_P, T takes on the identity of each and every point on the thrust line for some value of Lambda. In the more general case, it can be shown that the equation for T generates the line of minimum torque; but given the constraint that TORQUE_P be zero, this is indeed the same as the thrust line.

It has thus been shown that the point of contact can be calculated from information sufficient to determine the total force vector acting on the system as seen at some reference point, such as R. Let us now turn to the relationship between this total force vector and the values measured by the platform sensors.

Aquisition of Force Data

The thrust and torque on the system produce a displacement of the top plate which may be expressed as a combination of a rotation about R, followed by a translation. The three component rotation vector is represented as "ROTATION_R", and the three component translation vector as "TRANSLATION_R". The total displacement vector "D_R" is also defined as consisting of the components of translation followed by the components of rotation.

In the range where Hooke's law applies, the deflection is described by flexure matrix "FLEXMAT_R":

$$D\_R = \text{FLEXMAT\_R} * \text{TF\_R\_MEASURED}, \qquad 3$$

where "TF_R_MEASURED" is the sum of all forces, referred to R, except for the non-baseline spring forces. It is distinguished from TF_P@R in recognition of the non-equilibrium effects to be discussed in the next section.

Consider one particular sensor located at a point "S", the response of which is characterized by a sensitivity vector "SENSITIVITY_S". When the rigid extension of the top plate at S moves in the direction of SENSITIVITY_S, the sensor gives a maximum positive response which is equal to the product of the distance moved times the magnitude of SENSITIVITY_S. When the motion is perpendicular to this line, there is no response; that is:

$$\text{Response\_S} = \text{SENSITIVITY\_S dot TRANSLATION\_S}, \qquad 4$$

where "Response_S" is that one of the six components of the sensor data vector "RESPONSE" due to the sensor at S. (The operator "dot" is the vector dot product). In the limit of small rotations, the geometry of the system gives:

$$\text{TRANSLATION\_S} = \text{TRANSLATION\_R} + \text{ROTATION\_R cross } R\text{-->}S \qquad 5$$

The error is about one-half the rotation magnitude, in radians, times the result. Since the rotations of interest are less than one thousandth of a radian, the error is insignificant compared to desired accuracy. Taken together, the previous two relationships imply that the response is a linear transformation of the total displacement, the dependence being summarized in a 6 by 6 matrix "SENSMAT_R":

$$\text{RESPONSE} = \text{SENSMAT\_R} * D\_R \qquad 6$$

If, by definition, a 6 by 6 calibration matrix "CALMAT_R" is given by:

$$\text{CALMAT\_R} = \text{inverse (SENSMAT\_R} * \text{FLEXMAT\_R}), \qquad 7$$

there results:

$$\text{TF\_R\_MEASURED} = \text{CALMAT\_R} * \text{RESPONSE}. \qquad 8.$$

That CALMAT R be tractable requires that both FLEXMAT_R and SENSMAT_R be reasonably far from singular. For FLEXMAT_R, this means that the springs should have roughly comparable compliance in both compression and shear. They also should be spread apart a distance something like the size of the touch surface, to give a reasonable balance between torsional and translational stiffness. For SENSMAT_R, it means that sensors should be placed and oriented to respond as independently as possible. Again, how spread apart they are determines the relationship of rotational to translational sensitivities, the desirable balance being set by the touch surface size.

Interference from Intertial Effects

To this point, it has been assumed that forces are applied slowly and smoothly enough closely to approximate static equilibrium. In reality, the non-zero compliance of the display and platform imply a difference between "TF_R_MEASURED", the actual force sensed by the platform, and TF_R, the total force mathematically projected from point P. This difference may be represented as:

$$\text{TF\_R\_MEASURED} = \text{TF\_P@R} + \text{TF\_R\_INERTIAL}. \qquad 9$$

"TF_R_INERTIAL" is the reaction force of the display and top plate mass referred to R. It consists of excitations of the normal modes of vibration of this mass. It has power spectrum confined almost entirely to frequencies above a value somewhat below the lowest normal mode frequency.

It would be desirable to use standard linear filtering techniques to remove the corrupting influence of TF_R_INERTIAL. These techniques comprise taking various time-weighted averages of the measured data. It must first be demonstrated, however, that such averages will not disrupt the accuracy of contact localization in some other way.

Consider the time evolution of a typical touch force. It not only rises and falls, but constantly changes direction. As the fan shape swept out by the instantaneous thrust line will usually have some conical cupping to it, the thrust line of a summary average force does not necessarily lie close to any of the instantaneous values. Given that P itself does not move, however, (R—>P in equation 1b is constant), it can be seen that a time weighted average of the total force components at R, or of any linear transformation of those components, corresponds to the components (or transformed components) of a similarly time-weighted average of the instantaneous forces at P. But any sum of forces applied at P totals to a force at P, so the thrust line computed from the time weighted components ("effective thrust line") must pass through P.

Now a linear filter applied to TF_R_MEASURED will produce a response which is the sum of TF_P@R filtered and TF_R_INERTIAL filtered. The latter is close to zero for an appropriate filter, and, as above shown, the first term provides values which compute to the correct contact location, thus yielding the desired result.

An effective filter may be of known lowpass and/or notch design, preferably implemented digitally within the microprocessor system 80. Such a filter can have a group delay as low as 0.5 to 1 times the cycle time of the lowest normal mode of vibration, or something in the range of 0.1 second. As this is shorter than the typical touch duration, good measurement amplitude is maintained (i.e., the power spectrum of the touch lies in substantial part in frequencies lower than those of TF_R_INERTIAL), and reasonable response speed is achieved. Note in particular that this group delay is often much shorter than the damping time of the system—the excited vibrations may ring for many cycles before something approximating static equilibrium is achieved.

The Planar Model

There are many situations where a contact surface may be adequately approximated by a properly located flat plane. It is found that good results may be achieved in applying this special case to a touch application, if the maximum deviation of the surface from the plane does not exceed about 3 times the required accuracy; i.e., for most touches, the tangential component of the contact force is one-third or less of the normal one. Although practical difficulties in the placement of sensors within this same plane may elevate the cost and limit the applicability of the before-described prior art techniques in many such applications, the method of the invention for calculating an electrical model that results in remotely sensing the location of the touching point on the display surface provides a good solution.

Consider that the contact surface is to be labeled by a two-dimensional grid with coordinates "u" and "v". The origin of this grid is at point "O" in three-dimensional space, with which we associate the three dimensional basis vectors EU and EV. If the point of contact "P" is at coordinates $<u,v>$ within the grid, we may write:

$$R—>P = R—>O + u^*EU + v^*EV. \qquad 10$$

Now it can be shown that there exist three sets of six numbers, represented by the six component vectors U_CAL, V_CAL, and W_CAL, such that (in the static limit):

$$u = (\text{U\_CAL dot RESPONSE}) / (\text{W\_CAL dot RESPONSE}) \qquad 11a$$

$$v = (\text{V\_CAL dot RESPONSE}) / (\text{W\_CAL dot RESPONSE}) \qquad 11b$$

and "W_CAL dot RESPONSE" is proportional to the normal component of the contact force. For brevity, define:

$$us = \text{U\_CAL dot RESPONSE} \qquad 12a$$

$$vs = \text{V\_CAL dot RESPONSE} \qquad 12b$$

$$w = \text{W\_CAL dot RESPONSE} \qquad 12c$$

As "us", "vs", and "w" ultimately are just linear transformations of TF_R_MEASURED, the filtering described above may be applied to these derived data streams. Then the equations:

$$u = (\text{filtered us}) / (\text{filtered ws}) \qquad 13a$$

$$v = (\text{filtered vs}) / (\text{filtered ws}) \qquad 13b$$

closely approximate u and v without requiring static equilibrium. The "filtered w" may be monitored to determine the presence of contact; and well defined values of u and v may be calculated from the above equations whenever "filtered w" is large enough.

Consider now how values for U_CAL, V_CAL, and W_CAL can be obtained. After placing the display device in its position on the force-sensing platform, the user runs software which takes the user through a calibration procedure. This software may run on the host computer, if desired, rather than on microprocessor system 80. After the procedure is completed, the calibration values are downloaded via communication link 38 for storage in a small non-volatile memory which is part of 80. The system is then ready for use.

For convenience, let it be assumed that the grid which is to be used on the display screen has coordinates $<u,v> = <0,0>$ at the lower left corner, and $<u.v> = <1,1>$ at the upper right. The calibration itself can be performed as follows: The four points at the four corners of the screen, $<0,0>$, $<0,1>$ $<1,0>$ and $<1,1>$, are successively illuminated, and the user is instructed to press each one, three separate times as it appears. The user may be further instructed to deliver touches with an intentional and varying direction of sideways force, as this allows for more accurate calibration of the response to tangential components. The exact force and direction of each touch is not important, however; only that each is placed carefully at the indicated point.

For each of the six measurements made with $u=0$, it must be that "U_CAL dot RESPONSE" is also 0, since "w" is certainly not infinity. Thus U_CAL is a vector in the null space of the matrix made by collecting together these six measurements, and a scalar multiple of this can be extracted by standard methods, called "U_CAL_A". A similar multiple of V_CAL, "V_CAL_B", can be determined from the touches with $v=0$. While any arbitrary multiple of the calibration vectors taken together suffices, the relative scaling must be consistent. Define:

$$a = U\_CAL\_A / UCAL \quad\quad 14a$$

$$b = V\_CAL\_B / VCAL \quad\quad 14b$$

Dividing 11a by 11b, then multiplying both sides by a/b, we get for the touches at $<1,1>$:

$$a/b = (U\_CAL\_A \text{ dot RESPONSE}) / (V\_CAL\_B \text{ dot RESPONSE}) \quad 15$$

The value of a/b is determined from one such touch, or as the average of the ratios so derived. Then, $$V\_CAL\_A = (a/b)*V\_CAL\_B \quad\quad 16$$

Using equation 11a, for each of the six touches with $u=1$:

$$W\_CAL\_A \text{ dot RESPONSE} = U\_CAL\_A \text{ dot RESPONSE.} \quad 17$$

Collecting together the six numbers computed from the six right hand sides, and pre-multiplying this vector by the inverse of the matrix of the corresponding measurements, (a5 ROWS) W_CAL_A is extracted and the process completed.

A Non-Planar Model

Now to consider briefly an approach to the more general non-planar case.

At the factory, each platform can be pre-calibrated in a specially designed fixture which supplies a set of six precisely known forces. The forces are chosen such that the matrix of these forces, each expressed in terms of a specific reference point and coordinate system, such as R and 104, is readily invertible. The matrix of measurements is then multiplied by this inverse, yielding the desired calibration matrix (CALMAT_R, above), which is stored in the non-volatile memory.

In the field, the user calibration procedure presents the user with a point at the center of the display, and each of the four points centered along one edge. Two differently directed touches are requested for each point, and the point locations in space determined from the points of intersection of the thrust line pairs. Since the line will not precisely intersect, the mid-point of the segment is used which is perpendicular to both as a surrogate "intersection". If the segment is too long, or the lines of the pair are too close to parallel, the user will be prompted to repeat the point. That plane, vertically oriented cylinder, and sphere are now determined which best fit (in the RMS sense) the 5 test points. The quality of fit for each is compared and the shape passing closest to all the points is retained for use. (These three families tried here are by far the predominant geometries for display surfaces).

In application, the factory calibration matrix may be used to compute the thrust line in accordance with equation 2, above, with the use of appropriate filtering of the sensor data. The information from the user calibration is then employed for calculating the point of surface intersection in three space, which is reported via 38 in terms of the two-dimensional coordinates of that rectangular plane grid, which when orthogonally projected onto the postulated surface, places the 5 test points in the right place.

To recapitulate, in the application just described, explicit use is made within the embodiment itself of such entities as the thrust line, and the components of the total force at R, which were developed in the analysis. In the application to the planar case, however, they need not appear within the embodiment, although they were used to develop it. Thus, it may be seen that two different types of embodiments within the scope of the invention may employ calculations that may differ radically as to both structure and detail. What they do have in common, in accordance with the invention, is:

(1) Use of force-sensing means responsive to all six degrees of rigid motion; and (2) Calculating means which from the output of said force-sensing means, computes the location of a contact force; such computed location being substantially free of error caused by the presence of an unpredictable tangential component of the contact force, for all potential contact points of interest, including those well removed from the plane of the sensors.

The information provided by the proposed out-of-plane sensors of the invention is in fact theoretically sufficient to eliminate errors from the before-described tangential force component. While particular practical techniques for performing each stage of the required calculations have been presented, it is to be understood, however, that there are many different ways in which these calculations may be performed, and many variations in such matters as the location and orientation of sensors, type of sensor, type of support, etc.

Recapitulation of Distinguishment from Prior Art

In summary, thus, there are at least three major ways in which the methodology underlying the present invention distinguishes it from the previously described and other prior art techniques and which are responsible for the novel results attained with the invention.

First, the invention employs force-sensing means responsive to all six degrees of freedom of applied force and torque. Prior art methods, on the other hand, go out of their way to be sure that they are not responsive to tangential components.

Secondly, the present invention achieves force location away from the plane of the sensors, in spite of such tangential components.

Thirdly, the invention computes the point of least magnitude of the three-dimensional torque vector from among all points within the surface of interest, and then outputs this point as an estimate of the intersection point of the surface of interest with the thrust line of a contact force.

That this is, for all dispositions of this surface, distinct from prior art methods of sensing or calculating, is further explained below.

Each of the above characteristics clearly distinguishes the present invention from the before-described prior art and the results obtainable thereby.

Prior art methods, before explained, on the other hand, report the position within the flat plane of the sensors at which the magnitude of a certain two dimensional torque vector is zero. This vector may be viewed as the projection onto the plane of the sensors, at each point in space lying on that plane, of the true three dimensional torque vector at that point. Not only is the method of the invention far more general, in allowing the surface of interest even to be curved, and indeed remote from the plane of the sensors, but it is also conceptually and numerically distinct from prior art when applied to a flat plane which may contain the sensors.

To clarify this, consider the following: support a flat board at its corners with sensors operated in accordance with prior art. Place this whole apparatus in turn upon a device of the invention, so that locations of contact upon the board may simultaneously be read out by both methods. Drive a screw into the board at 45 degrees to the surface (or at any angle that is not perfectly perpendicular). Again, press the screwdriver, also at 45 degrees, against the screw head, but without twisting. At this point, both methods will report the correct contact location.

Both two- and three-dimensional torque vectors are zero at the point of contact. The field of the three dimensional torque vector can be visualized as cylinders of equal length arrows centered on the thrust line, the arrow length for each cylinder rising in proportion to the cylinder's radius. The individual arrows lie perpendicular to the thrust line and pursue each other around it in a circular pattern.

Now, as the screwdriver is twisted to the right, a non-zero torque vector appears at the point of contact which points into the board parallel to the thrust line. This component appears uniformly added throughout the field, lengthening the arrows everywhere and bending them to point somewhat in the direction of the thrust (they now appear to pursue each other in right-handed helices).

Since the minimum magnitude still lies along the thrust line, where only the parallel component is present, the method of the invention alone continues to report the correct contact point. The two-dimensional projection of the parallel component at the point of contact cannot be zero, since it is inclined to the surface normal (as it must always be, to at least some extent, for any real force). Away from the thrust line, however, the helical inclination of the torque field causes the two-dimensional projection of some particular vector to vanish at an extraneous point.

Imagine the board horizontal and the screwdriver inclined toward the user, with a line drawn on the board through the point of contact, extending to the right at right angles to the thrust line. Pick a point on this line, say, 2 inches from the screw. Press on the screw with a 1 pound force, while applying 2 pound inches clockwise torque with the screwdriver. The torque component occasioned (at the point just cited) by the thrust has magnitude 2 pound inches and points into the board inclined 45 degrees toward the user. The torque component occasioned by the twisting has magnitude 2 pound inches and points into the board inclined 45 degrees away from the user. The resultant has magnitude 2.818 pound inches, directly normal to the board. Its projection into the surface, therefore, has zero magnitude; this is the location of the extraneous point reported as the contact location by the prior art methods.

Note that the previously described calibration methods do not necessarily define a surface of interest which is coincident with the external surface of the display device. When the user directs touches "through" the illuminated point of the screen from two or more different directions, the user may well be touching physically different points on the surface. Thus, when using a cathode-ray tube monitor with a thick glass faceplate, the surface of interest is located where the phosphors appear to be; and this may be defined implicitly in the application through the effect of the calibration procedure, allowing the device to project a virtual response surface to match. The point of intersection of the thrust line with this response surface is closely approximated by finding the point within the virtual response surface having the least magnitude of the three-dimensional torque vector.

The method of the invention is distinguished from the prior art in that it reports the location within a surface of interest at which the three-dimensional torque vector takes on minimum magnitude (i.e. has shortest length). Indeed, this may be taken as a description of the sole calculational requirement of the invention.

Further modifications will also occur to those skilled in this art including, for example, other types of similarly functioning springs and sensors, as desired; and other locations of the external force-sensing platform contacting or abutting or otherwise touching the monitor or other apparatus carrying the surface upon which touch or other contact events are to be located, including for more general applications, placement internally of or behind the supported apparatus. All such supporting or abutting platforms or objects for a surface of interest of whatever shape, are generically termed herein as a "display surface portion" or similar term for generically termed "display apparatus". Other, more general "surfaces of interest" may be imagined. Consider the force applied to a glass window on a vending machine when a customer presses and points to a desired object far inside. The surface of each object is then a "surface of interest", potentially intersecting the line of minimum torque. A medical student, for example, may point to invisible organs within the torso of an opaque human model; the model may be quite hollow, yet mathematical descriptions may be found for the surfaces of interest corresponding to the organs that would be there were the model real. Those skilled in the art will readily see how such surfaces might be adequately described within the overall calculating means to be employed, and how the method of the invention can be applied to such and other particular cases. Thus the "surface(s) of interest", and the corresponding desired "virtual response surface(s)", are defined by the application and the intent of the user, without being restricted by the specific illustrated particulars of the described mode of the invention. It is also to be understood, as before stated, that the invention is useful with other types of electro-optical display surfaces than cathode-ray tubes, including, but not limited to, LCD and LED displays. Such and other indicated modifications are deemed to fall within the spirit and scope of the invention as defined in the appended claims.

What is claimed is:

1. A method of determination of touch location on a display surface portion of display apparatus, that comprises, contacting the display apparatus against a force-sensing platform disposed remotely from the display surface portion itself and having degrees of freedom and sensing sensitivity collectively to sense, in response to the thrust of touching a point of the display surface portion, the coordinate components of a resulting thrust vector and the components of an accompanying torque vector; calculating from the sensed forces a location on the display surface portion referred to which the measured force has substantially minimum torque magnitude; and outputting the resulting remotely sensed location as an estimate of said touching point.

2. A method as claimed in claim 1 and in which the force-sensing is responsive to six degrees of freedom of rigid motion of the display apparatus including the x, y and z axis coordinate components of the resulting thrust vector, and the roll, pitch and yaw components of the accompanying torque vector caused by said touching.

3. A method as claimed in claim 2 and in which said sensing is effected by spring mounting action between a pair of spaced parallel plates comprising the platform, and contacting the display apparatus at a region remote from the display screen portion thereof.

4. A method of determination of touch location on a surface carried by an apparatus, that comprises, contacting a region of the apparatus remote from said surface against a force-sensing means having degrees of freedom and sensing sensitivity collectively to sense, in response to the thrust of touching a point of the surface, the coordinate components of a resulting thrust vector and the components of an accompanying torque vector; calculating from the sensed forces, a location on a line of minimum torque to provide an intersection of the surface; and outputting the resulting remotely sensed location as an estimate of said touching point.

5. A method as claimed in claim 4 and in which said calculating comprises developing from the sensed forces an electrical model containing a direction perpendicular to the plane containing the thrust and torque vectors at a reference point, proceeding along said direction a distance equal to the magnitude of the torque vector divided by the magnitude of the thrust vector to reach a location on a thrust line closest to the reference point; and extending the thrust vector through said point to provide an intersection of the display surface.

6. A method of determination of touch location on a display surface portion of display apparatus, that comprises, contacting the display apparatus against a force-sensing platform disposed remotely from the display surface portion itself and being responsive to all six degrees of rigid motion of force and torque vectors resulting from touching said display surface portion of the display apparatus; sensing at the platform the forces developed by such touching of the display surface portion; calculating from the sensed forces a location on the display surface portion referred to which the equivalent of the sensed forces has substantially minimum torque magnitude; and outputting the resulting remotely sensed location as an estimate of the touching point.

7. A method as claimed in claim 6 and in which said calculating includes computing the point of least magnitude of the three dimensions of the said torque vector from among all points within the display surface.

8. A method of determination of touch location on a surface of an apparatus, that comprises, contacting the apparatus against force-sensing means disposed remotely from the surface itself and responsive to all six degrees of rigid motion of force and torque vectors resulting from touching said surface; sensing at the said force-sensing means the forces developed by such touching of the surface; calculating from the sensed forces a location on said surface referred to which the equivalent of the sensed forces has substantially minimum torque magnitude; and outputting the resulting remotely sensed location as an estimate of the touching point.

9. A method as claimed in claim 8 and in which the said apparatus comprises a computer input device, and said touching is effected by one of the hand of a user, a stylus or other tool.

10. A method as claimed in claim 8 and in which the computer input device includes a computer display device.

11. A method as claimed in claim 8 and in which said surface is a virtual response surface effectively coincident with a visible displaying surface.

12. A method as claimed in claim 11 and in which the virtual response surface is effectively coincident an exterior physical surface overlying the said visible displaying surface.

13. A touch screen sensing apparatus for a monitor provided with a display screen having, in combination, force-sensing platform means contacting the monitor at a region thereof remote from the display screen; the platform means being provided with sensor means in number and degrees of freedom collectively to sense, in response to the thrust of touching a point of the display screen, measurements corresponding to the coordinate components of a resulting thrust vector and the components of an accompanying torque vector; means for calculating from said sensed forces a location on the display screen referred to which the measured force has substantially minimum torque magnitude; and means for outputting the resulting remotely sensed location as an estimate of said touching point.

14. Apparatus as claimed in claim 13 and in which the sensor means provides six degrees of freedom, sensing linearly independent combinations of the x, y and z coordinate components of the thrust vector and the roll, pitch and yaw components of the accompanying torque vector.

15. Apparatus as claimed in claim 14 and in which the monitor rests upon the platform means.

16. Apparatus as claimed in claim 15 and in which the platform means comprises a pair of spring mounted spaced parallel plates.

17. Apparatus as claimed in claim 13 and in which the calculating means comprises a microprocessor provided with means for developing from the encoding an electrical model containing a direction perpendicular to the plane containing the thrust and torque vectors at a reference point, means enabling proceeding along said direction a distance equal to the magnitude of the torque vector divided by the magnitude of the thrust vector to reach a location on a thrust line closest to the reference point and for extending the thrust vector through said point to provide an intersection of the display surface.

18. Apparatus as claimed in claim 15 and in which means is provided for insuring an accurate and reproduceable positioning of the monitor upon the platform means.

19. Apparatus as claimed in claim 17 and in which the force-sensing platform means is provided with a plurality of distributed sensors positioned and of directional sensitivity sufficient to respond to all six degrees of freedom of platform motion by corresponding sensor outputs.

20. Apparatus as claimed in claim 19 and in which means is provided for respectively detecting, scaling and multiplexing the said sensor outputs and applying such outputs through an A/D converter, as of the slope type, to the said microprocesser.

* * * * *